United States Patent [19]

Mathis et al.

[11] 3,933,707

[45] Jan. 20, 1976

[54] DYEABLE POLYMERS OF ALPHA-OLEFINS CONTAINING A NICKEL SALT AND A TEREPHTHALIC ESTER

[75] Inventors: Ronald D. Mathis, Mauldin, S.C.; John H. Underwood, Charlotte, N.C.; James S. Dix, Taylors, S.C.

[73] Assignee: Phillips Petroleum Company, Bartlesville, Okla.

[22] Filed: Mar. 11, 1971

[21] Appl. No.: 123,384

[52] U.S. Cl............ 260/23 H; 8/180; 260/31.8 PQ; 260/45.75 N; 260/45.85 T
[51] Int. Cl.².................... C08K 3/10; C08K 5/12
[58] Field of Search... 260/23 H, 31.8 PQ, 94.9 GD, 260/41 C, 45.85 T, 45.75 N; 8/180

[56] References Cited
UNITED STATES PATENTS

| | | | |
|---|---|---|---|
| 2,893,976 | 7/1959 | Popielski | 260/45.85 X |
| 3,080,339 | 3/1963 | Gordon | 260/45.85 |
| 3,248,248 | 4/1966 | Coran et al. | 260/45.85 X |
| 3,303,162 | 2/1967 | Fuchsman | 260/45.85 X |
| 3,310,509 | 3/1967 | Fukumoto et al. | 260/23 |
| 3,310,548 | 3/1967 | Karoly et al. | 260/93.7 |
| 3,314,919 | 4/1967 | Most | 260/45.85 |
| 3,320,226 | 5/1967 | Cappuccio et al. | 260/93.7 |
| 3,322,704 | 5/1967 | Berger et al. | 260/23 |
| 3,591,536 | 7/1971 | Fukuma et al. | 260/31.8 X |

*Primary Examiner*—Eugene C. Rzucidlo

[57] ABSTRACT

Alpha-olefin polymers made dyeable by the addition of a mixture of a nickel compound and an ester of terephthalic acid.

12 Claims, No Drawings

DYEABLE POLYMERS OF ALPHA-OLEFINS CONTAINING A NICKEL SALT AND A TEREPHTHALIC ESTER

FIELD OF INVENTION

This invention relates to dyeable α-olefin polymer compositions. Other aspects of this invention relate to methods for preparing dyeable α-olefin polymers. Another aspect of this invention relates to mixtures of a nickel compound and an ester of terephthalic acid.

BACKGROUND OF THE INVENTION

The use of α-olefin polymers in the manufacture of fibers and films is a well known art. Quite often the market value of α-olefin polymer fibers and/or films is directly related to their appearance, especially when used in articles of manufacture such as knitted or woven carpets and fabrics. The appearance of α-olefin polymers, such as polypropylene, is sometimes improved by incorporating in the polymer additives which aid in the development of desirable color features, such as improved depth of color or color quality. Metals salts of organic acids, polyalkylene oxides, hydrocarbon oils and waxes have been suggested by the prior art (U.S. Pat. No. 3,322,704) as additives which will improve the dyeability or color quality of α-olefin polymers. Because of the commercial interest in α-olefin polymers having improved color quality the search for additives which improve dyeability of α-olefin polymers continues.

SUMMARY OF THE INVENTION

This invention relates to α-olefin polymers that contain a nickel compound and an ester of terephthalic acid which exhibit excellent dyeability, depth of color and color quality. This invention also relates to methods of preparing polymers of α-olefins that contain a nickel compound and an ester of terephthalic acid having excellent depth of color and color quality.

DESCRIPTION OF PREFERRED EMBODIMENTS

Any suitable α-olefin polymer can be employed in the practice of this invention. Polymers prepared from monomers having from 2 to 10 carbon atoms per molecule are conveniently used because of their ready commercial availability from many sources. The polymers can be homopolymers or copolymers of α-olefin monomers such as ethylene, propylene, butene-1, pentene-1, hexene-1, heptene-1, octene-1, nonene-1, and decene-1 including block, graft or random copolymerized forms thereof including ethylene-propylene, ethylene-butene-1 and ethylene hexene-1 copolymers. Polymers of propylene including homopolymers and copolymers because of their commercial importance as fibers, films and other shaped articles constitute a preferred polymer class within the scope of this invention.

Nickel compounds which can be mixed with an ester of terephthalic acid can be any inorganic or organic, soluble or insoluble nickel compound providing the nickel compound is stable during manufacturing operations. Representative nickel compounds are nickel chloride, nickel sulfate, nickel acetate, nickel stearate, nickel pelargonate, nickel 2-ethylhexanoate, nickel myristate, nickel ethylenediamine, nickel fumarate, nickel terephthalate and nickel alanine. Preferred nickel compounds are nickel salts of aliphatic organic acids such as nickel stearate, nickel acetate, and nickel 2-ethylhexanoate.

The esters of terephthalic acid employed in the practice of this invention include compounds having the formula

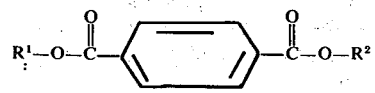

wherein $R^1$ and $R^2$ represent aliphatic, alicyclic, aromatic hydrocarbon groups, and combinations thereof, and $R^1$ and $R^2$ are the same or different. It is preferred that the total carbon content of each $R^1$ and $R^2$ group is in the range of 1 to 20 carbon atoms. Representative terephthalic acid esters included within the above definition are dimethyl terephthalate, diethyl terephthalate, methyl ethyl terephthalate, didodecyl terephthalate, dicyclohexyl terephthalate, dodecyl cyclohexyl terephthalate, dibenzyl terephthalate, diphenyl terephthalate, butyl phenyl terephthalate, dieicosyl terephthalate, and the like. Preferred esters of terephthalic acid are those compounds wherein the $R^1$ and $R^2$ groups are aromatic groups, for example, diphenyl terephthalate, dinapthyl terephthalate, phenyl naphthyl terephthalate.

In the practice of this invention the nickel compound and the terephthalic ester can be incorporated into α-olefin polymers in any manner so long as they are uniformly distributed throughout the polymer compositions. For example, suitable procedures involve dry blending of the nickel compound and terephthalic ester (sometimes referred to hereafter as the nickel-ester additives) in a subdivided form, with polymer fluff or powder with subsequent mastication of the polymer and the nickel-ester additives at elevated temperatures. Additives customarily employed by the art to stabilize α-olefin polymers against the degradation effect of heat, light, oxygen, as well as other additives which improve or aid in dyeing α-olefin polymers can be incorporated in α-olefin polymers along with the nickel-ester additives disclosed by this invention.

In addition the α-olefin polymer compositions of this invention can also contain fillers, pigments, plasticizers, and other inert ingredients frequently incorporated in α-olefin polymers of economic and processing reasons.

The preferred amount of nickel compound per 100 parts of α-olefin polymer is in the range of 0.05 to 5.0 parts by weight while the preferred amount of terephthalic acid ester is in the range of 0.1 to 4.0 parts of terephthalic acid ester. Accordingly, the proportions of nickel compound to terephthalic acid ester when admixed with α-olefin polymers may vary from 50 parts of nickel compound to 1 part of terephalic acid ester compound to 1 part of nickel compound to 80 parts of terephthalic acid ester compound. Generally, optimum dyeability is obtained when approximately 1 part of nickel compound and 2 parts of terephthalic acid ester compound be employed per 100 parts of α-olefin polymer.

As required for any α-olefin polymer application, those skilled in the art will be able to determine the optimum amount of the nickel-ester additives required to obtain the desired degree of dyeability improvement in a specific polymer by following simple test procedures.

EXAMPLE I

As illustrated in Table I, a polypropylene composition A was prepared by dry blending (1) polypropylene; (2) a thermal antioxidant, Irganox 1010, tetrakis[-methylene(3,5-di-tertiary-butyl-4-hydroxyhydrocinnamate)]methane; (3) a processing additive, DOPI, dioctyl phosphite; (4) a thermal stabilizer, BHT, 2,6-di-t-butyl-4-methylphenol; and (5) a nickel compound, nickel stearate.

Seven additional polymer compositions B through H similar to A were prepared and admixed with alternate chemical additives (6 through 12).

TABLE I

|  | A | B | C | D | E | F | G | H |
|---|---|---|---|---|---|---|---|---|
| (1) Polypropylene | 100.00 | 100.00 | 100.00 | 100.00 | 100.00 | 100.00 | 100.00 | 100.00 |
| (2) Irganox 1010 | 0.05 | 0.05 | 0.05 | 0.05 | 0.05 | 0.05 | 0.05 | 0.05 |
| (3) DOPI | 0.10 | 0.10 | 0.10 | 0.10 | 0.10 | 0.10 | 0.10 | 0.10 |
| (4) BHT | 0.02 | 0.02 | 0.02 | 0.02 | 0.02 | 0.02 | 0.02 | 0.02 |
| (5) Nickel stearate | 0.5 | 0.5 | 0.5 | 0.5 | 0.5 | 0.5 | 0.5 | 0.5 |
| (6) Diphenyl terephthalate | — | 1.0 | — | — | — | — | — | — |
| (7) Diphenyl orthophthalate | — | — | 1.0 | — | — | — | — | — |
| (8) Butyl benzyl orthophthalate | — | — | — | 1.0 | — | — | — | — |
| (9) N,N'-distearyl-ethylenediamine | — | — | — | — | 1.0 | — | — | — |
| (10) Polyethylene oxide | — | — | — | — | — | 1.0 | — | — |
| (11) Alkyl sulfolanyl ether | — | — | — | — | — | — | 1.0 | — |
| (12) Aromatic oil, Bp 190°C | — | — | — | — | — | — | — | 1.0 |

The eight polypropylene polymer compositions A through H set out above were processed into knitted fabric prepared from 150/8 yarn (150/8 yarn is yarn composed of eight filaments with a total denier of 150). The knitted fabric was dyed as described below. A panel consisting of four people rated the relative dyeability of the knitted fabric samples by designating those samples having the deepest or best color by the number 1 and those with the lightest or poorest color by the number 3. The panel's ratings are shown in Table II.

TABLE II

|  | A | B | C | D | E | F | G | H |
|---|---|---|---|---|---|---|---|---|
| Dyeability Rating | 2 | 1 | 2 | 2 | 3 | 3 | 2 | 2 |

Quite unexpectedly, the dyeability of nickel-terephthalic ester polypropylene mixtures, B above, was significantly better than the dyeability of nickel-orthophthalate ester polypropylene mixtures, C and D above, as shown by the panel's ratings. In addition, the nickel-terephthalic ester polypropylene mixtures were rated the best in dyeability over all other nickelalternate chemical polypropylene compositions.

DYEING PROCEDURE

Dyeing of individual knitted fabric samples of the compositions described in Example I A through H approximately three inches square having a thickness of approximately a 1/32 to 1/64 of an inch containing approximately 100 filaments per square inch was carried out accordingly:

1. a print paste consisting of (a) 50% by weight of a 5% by weight Syngum mixture is butyl alcohol and water which had been stirred until smooth and (b) 50% by weight of a color solution consisting of varying amounts% depending on the dye used (Petramin Yellow GL — 2%, Petramin Red BL (50% paste) — 4%; Petramin Dark Blue GL — 1%); citric acid — 6%; Cibaphasol AS — 2%; Versene — 2%; Tamol SN — 2% (used with dry dye powders only) and sufficient water to make up at total color solution weight % of 100 which has been heated at 160°F and stirred until smooth, were combined and stirred until smooth.

2. the knitted fabric sample using print paste prepared in accordance with (1) above was squeegeed with enough print paste to completely flood the knitted fabric.

3. the fabric sample then was dried approximately 15 minutes. Drying was carried out until the samples were dry to the touch, and did not exhibit any color change. The sample was then steam heated in a steam autoclave for 15 minutes at 105°–110°C.

4. the fabric sample was then rinsed in lukewarm running water until all bleed-off color had been removed.

5. the sample was then soaped for 30 seconds in a sodium carbonate solution (2 grams per liter of water) and Igepal CO-630 solution (1 gram per 1 liter of water) at 160°F, rinsed to remove all traces of soap particles (as indicated by bubbles and slippery feel), run through a padder, centrifugally extracted, dried in air and then evaluated by representatives of the color panel as indicated in Example I above.

As illustrated by the above example, the dyes which are useful in the practice of this invention include metallizable dyes. These dyes are frequently referred to as chelating or metallizable disperse dyes, so called because they form stable chelate complexes with metal substances contained within the composition which is to be dyed. Preferred dyes within the scope of this invention include metallizable disperse dyes so called because they are water-insoluble and can be dispersed in water in a very fine particle size. Representative of dyes useful in the practice of this invention include metallizable disperse azo, disperse antraquinone, and disperse nitroarylamine dyes. The terms "disperse, chelating, azo, antraquinone and nitroarylamine" as customarily employed by those skilled in the art are illustrated and fully described in Encyclopedia of Polymer Science and Technology, Vol. 5, 1966, Copyright to John Wiley and Sons, Inc., Library of Congress Catalog Card Number 64-22188.

Also included with the term as to metallizable disperse dyes in the practice of this invention are petramin dyes manufactured by Verona Dyestuffs, a Division of Verona-Pharma Chemical Corporation and marketed under the trade-names Petramin Yellow GL, Petramin Yellow FRL, Petramin Yellow F3RL, Petramin Orange 5 GL, Petramin Orange 5 R, Petramin Red FBB, Petramin Violet R, Petramin Blue B, Petramin Blue GGL, Petramin Dark Blue GL, Petramin Brown 3 R, and "National Polypropylene" series of dyes produced by the National Aniline Division of the Allied Chemical Company including Polypropylene Green B, Polypropylene Brilliant Blue B, Polypropylene Brilliant Orange R, Polypropylene Violet 3BR, Polypropylene Red 2B, and Polypropylene Yellow R.

We claim:

1. A dyeable α-olefin polymer composition comprising an α-olefin polymer, a nickel compound selected from the class consisting of nickel salts of aliphatic organic acids, and a di-ester of terephthalic acid, said nickel compound being present in an amount of from 0.05 to 5.0 parts per 100 parts by weight of said α-olefin polymer, and said di-ester being present in an amount of from 0.1 to 4.0 parts per 100 parts by weight of said α-olefin polymer.

2. A composition in accordance with claim 1 wherein said nickel compound is nickel stearate, nickel acetate, nickel pelargonate, nickel 2-ethylhexanoate, and nickel myristate.

3. A composition in accordance with claim 1 further comprising a metallizable dye.

4. A composition in accordance with claim 3 wherein said di-ester is selected from the class consisting of compounds having the formula

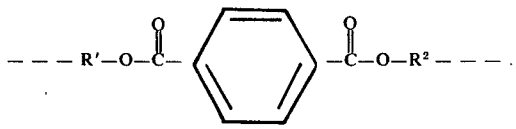

wherein $R^1$ and $R^2$ are individually selected from the class consisting of aliphatic, alicyclic, aromatic hydrocarbon groups, and combinations thereof wherein the total carbon content of each $R^1$ and $R^2$ group is in the range of from 1 to 20 carbon atoms.

5. A composition in accordance with claim 4 wherein said α-olefin polymer is a polymer of at least one α-olefin monomer having from 2 to 10 carbon atoms.

6. A composition in accordance with claim 4 wherein said α-olefin polymer is a polymer of propylene.

7. A composition in accordance with claim 6 wherein said di-ester is dimethyl terephthalate.

8. A composition in accordance with claim 6 wherein said di-ester is diphenyl terephthalate and said nickel compound is nickel stearate.

9. A composition in accordance with claim 3 wherein said metallizable dye is selected from the class consisting of metallizable disperse azo, anthraquinone, and nitroarylamine dyes.

10. A composition in accordance with claim 3 wherein said metallizable dye is a metallizable disperse azo dye.

11. A composition in accordance with claim 1 wherein said di-ester is diphenyl terephthalate.

12. A composition in accordance with claim 11 wherein said nickel compound is nickel stearate.

* * * * *